US008203819B2

(12) United States Patent
Bobert

(10) Patent No.: US 8,203,819 B2

(45) Date of Patent: Jun. 19, 2012

(54) ELECTRICAL PROTECTION COMPONENT WITH A SHORT-CIRCUITING DEVICE

(75) Inventor: Peter Bobert, Falkensee (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 12/843,613

(22) Filed: Jul. 26, 2010

(65) Prior Publication Data

US 2011/0013335 A1 Jan. 20, 2011

Related U.S. Application Data

(63) Continuation of application No. PCT/EP2009/000515, filed on Jan. 27, 2009.

(30) Foreign Application Priority Data

Jan. 31, 2008 (DE) ......................... 10 2008 006 991
May 8, 2008 (DE) ......................... 10 2008 022 794

(51) Int. Cl.
*H02H 1/00* (2006.01)
*H02H 3/22* (2006.01)
*H01H 39/00* (2006.01)

(52) U.S. Cl. .......... 361/124; 361/117; 361/125; 337/31; 337/32; 337/33

(58) Field of Classification Search .................. 361/124, 361/117, 125; 337/31–33
See application file for complete search history.

(56) References Cited

U.S. PATENT DOCUMENTS 3,975,664 A * 8/1976 Baumbach .................... 361/124
4,851,946 A 7/1989 Igarashi et al.
4,866,563 A * 9/1989 Howard et al. ............... 361/124
5,248,953 A * 9/1993 Honl ............................... 337/32
5,450,269 A * 9/1995 Hsieh ............................ 361/119
6,445,560 B1 9/2002 Bobert et al.
7,974,063 B2 * 7/2011 Vo et al. ........................ 361/129

FOREIGN PATENT DOCUMENTS

EP 0 962 037 B1 12/1999
FR 2 670 624 A1 6/1992
WO WO 87/06399 A1 10/1987

* cited by examiner

*Primary Examiner* — Jared Fureman
*Assistant Examiner* — Scott Bauer
(74) *Attorney, Agent, or Firm* — Slater & Matsil, L.L.P.

(57) ABSTRACT

An electrical protection component with a short-circuiting device includes a gas-filled surge arrester that includes at least two electrodes. Preferably, one electrode in each case is arranged at the ends of the surge arrester. The electrical protection component has a thermal short-circuiting device, wherein the thermal short-circuiting device includes a clip having at least two sections. At least a first section of the clip is attached to the surge arrester by snap action. At least a second section of the clip at least partly surrounds the first section and is spaced apart from the first section by means of a fusible element. The second section has a short-circuiting link at an end. The short-circuiting link electrically connects the electrodes of the surge arrester to one another in the case where the fusible element melts.

16 Claims, 6 Drawing Sheets

ELECTRICAL PROTECTION COMPONENT WITH A SHORT-CIRCUITING DEVICE

This application is a continuation of co-pending International Application No. PCT/EP2009/000515, filed Jan. 27, 2009, which designated the United States and was not published in English, and which claims priority to German Application No. 10 2008 006 991.4, filed Jan. 31, 2008, and German Application No. 10 2008 022 794.3, filed May 8, 2008, each of which is incorporated herein by reference.

BACKGROUND

The document EP 0 962 037 B1, U.S. equivalent U.S. Pat. No. 6,445,560 B1, discloses a gas-filled surge arrester with an external short-circuiting device.

SUMMARY

In one aspect, the present invention to specify an electrical protection component with a short-circuiting device which has improved mountability.

An electrical protection component with a short-circuiting device comprises a surge arrester. The surge arrester has a hollow body, at which at least two electrodes are arranged. A surge arrester having two electrodes has an integral ceramic hollow body. In the case of a three-electrode arrester, the ceramic hollow body is subdivided into two separate parts by means of a central electrode. The two parts are arranged with a first side at a central electrode. An end electrode is respectively arranged at a second side of the two parts.

The electrical protection component comprises a thermal short-circuiting device. The short-circuiting device comprises a clip, which is attached to the surge arrester of the electrical protection component by snap action.

The clip has at least two sections. At least one first section of the clip is attached to the surge arrester by snap action and engages around more than half of the surge arrester. The first section of the short-circuiting link therefore preferably serves for fixing the short-circuiting link to the surge arrester. At least the ends of the first section have a mechanical contact with the surge arrester. In a further embodiment, however, the ends of the first section can also be spaced apart from the surge arrester, wherein at least one partial region of the first section is arranged at the surge arrester in such a way that the short-circuiting device can thereby still be securely fixed to the surge arrester. The remaining region of the first section can bear on the surge arrester or else be spaced apart from the latter.

The clip comprises at least one second section which surrounds the first section and is spaced apart from the first section by means of a fusible element. The second section has a short-circuiting link at one end, the short-circuiting link being spaced apart radially from the surge arrester. In the case where the fusible element melts, the short-circuiting link electrically connects at least two external electrodes of the surge arrester to one another.

The first section of the clip preferably engages around more than half of the surge arrester. This prevents the clip from being forced away from the surge arrester in the case where the short-circuiting mechanism is triggered. The first section of the clip therefore serves as a counterbearing for the short-circuiting link.

In the case of a surge arrester having three electrodes, the third, central electrode can have a somewhat larger diameter than the two hollow bodies and the two end electrodes. The central electrode can project beyond the hollow bodies and the end electrodes preferably in a radial direction.

Preferably, the clip comprises a bent flat strip, which can have one or more cutouts. The cutouts serve to ensure that the clip can be fixed securely against slipping in the region of the central electrode in the case of a three-electrode arrester. The cutouts preferably have the width of the central electrode, such that the central electrode partly projects into the cutouts in the clip. Slipping of the clip in an axial direction is thereby suppressed.

There is preferably situated in the region of the fusible element a cutout which is preferably somewhat smaller in dimensions than the fusible element, such that the fusible element cannot slip through the cutout in a manner that would make it more difficult to attach the short-circuiting clips to the surge arrester by snap action.

In a further embodiment, the fusible element has a stepped portion on at least one side, such that at least one part of the fusible element projects into the cutout. As a result, the fusible element at least partly has a direct contact with the central electrode of the surge arrester. A virtually optimum heat transfer from the surge arrester to the fusible element is thus present.

In a further embodiment, the cutout in the region of the fusible element is preferably of a size such that the central electrode projects through the cutout to an extent such that the central electrode has a direct contact with the fusible element. Consequently, a virtually optimum heat transfer from the surge arrester to the fusible element is likewise present.

The clip preferably comprises an elongated flat strip, wherein the short-circuiting link is wider than the rest of the clip.

In one preferred embodiment, the first and second sections of the clip are formed by an integral part.

In a further embodiment, however, it is also possible for the clip to be composed of at least two parts.

Preferably, the first section of the clip is formed by a first part and the second section is formed by a second part.

In a further embodiment, however, it is also possible for the second section to be formed by regions of the first part and of a second part.

Preferably, in the case of a clip composed of a plurality of parts, the parts of the clip consist of different materials.

However, it is also possible for the parts of the clip to consist of the same material.

Preferably, at least the short-circuiting link consists of an electrically conductive material.

In particular a material having resilient properties is suitable for this purpose. In order that the clip of the short-circuiting device can permanently exert pressure on the fusible element, in particular, a material comprising beryllium copper is suitable for this purpose. Beryllium copper is particularly well suited to a short-circuiting clip since it maintains its spring force even in the case of excessively high heating. Beryllium copper has a long-lasting spring force. In comparison with a spring steel, beryllium copper has a better electrical conductivity. The flat strip for the clip can be produced from beryllium copper, for example, by means of stamping in a cost-effective manner and without high technical complexity.

In one embodiment, the flat strip is brought to the desired form by bending, for example. In the case of a two-part clip, the two prepared parts are joined together and are mechanically connected to one another. By way of example, the two parts are directly connected to one another by means of a welding connection.

The clip is preferably attached to the surge arrester by snap action in the region of a central electrode of the surge arrester.

In a further embodiment, a two-electrode arrester can also be involved, wherein the short-circuiting link in this case is mechanically connected to the surge arrester, for example, by means of a ring or a clamp in the region of the hollow body.

The fusible element is preferably designed in such a way that it melts in the event of impermissible high heating of the surge arrester. The fusible element can consist of a material comprising solder. Materials comprising plastic are furthermore suitable. Forms which have a largest possible volume in conjunction with a small amount of material are suitable, in particular. In this case, hollow bodies such as tubular bodies, for example, are suitable, in particular.

The short-circuiting link can be spaced apart by such a fusible element. In the case of impermissibly high heating of the surge arrester, bodies having cavities melt more rapidly than solid bodies of the same size. As a result, the electrical protection component has a fast reaction time.

The fusible element is preferably arranged in such a way that the short-circuiting link is spaced apart from the external electrodes by the fusible element. In the case where the fusible element melts, the clip presses onto the external electrodes of the surge arrester and electrically connects them to one another. In the case of a surge arrester having an additional central electrode, the short-circuiting link connects the external electrodes to the central electrode.

A surge arrester of SMD (Surface Mount Device) design is preferably involved. It is also possible for a surge arrester having wire contacts for conventional mounting to be involved.

The short-circuiting clip is designed in such a way that the already preassembled short-circuiting clip including fusible element is attached to the surge arrester by snap action, in particular, after the surge arrester has been soldered in on a mounting substrate, for example. However, the short-circuiting clip can also be attached to the surge arrester by snap action actually prior to mounting.

The short-circuiting clip therefore has the advantage that it can be attached by snap action after the surge arrester has been soldered in or soldered on. The fusible element is already arranged in the preassembled short-circuiting clip, such that the fusible element no longer has to be incorporated subsequently.

Precisely in the case of surge arresters of SMD design there is the problem that the surge arrester is subjected to impermissibly high heating during the soldering process and thereby enters the thermal response range of the short-circuiting device. This leads to restrictions particularly in the case of surge arresters of SMD design, which leads to manufacturing difficulties. In comparison with conventional surge arresters with short-circuiting devices that are soldered in manually, additional cooling during the soldering process, which protects the surge arrester against excessively high heating, is consequently not necessary. Likewise, in the case of wave soldering or in the case of reflow soldering, a specially adapted temperature profile that precludes excessive heating is in this case not necessary any more.

BRIEF DESCRIPTION OF THE DRAWINGS

The subjects described above will be explained in greater detail on the basis of the following figures and exemplary embodiments.

The drawings described below should not be regarded as true to scale. Rather, individual dimensions may be illustrated as enlarged, reduced in size or even distorted, for the sake of improved illustration. Elements which are identical to one another or which perform the same function are designated by the same reference symbols.

Figure 1A:
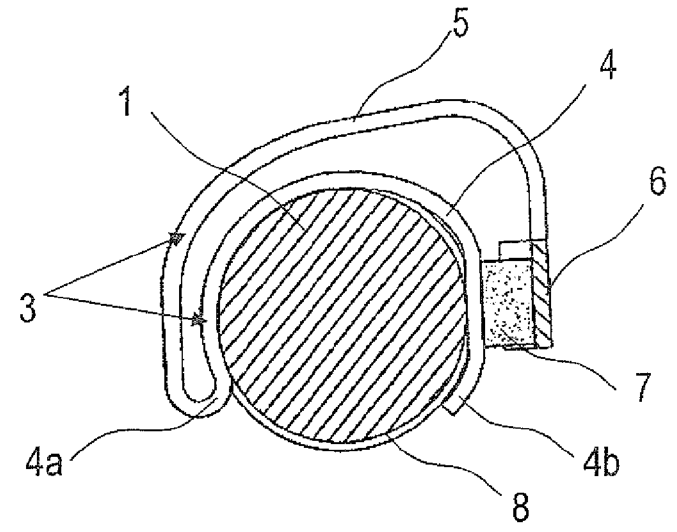
FIG. 1*a* shows an electrical protection component with an integral short-circuiting clip in cross section.

The following list of reference symbols may be used in conjunction with the drawings:

1 Surge arrester
2 Electrode
3 Clip
4 First section
4*a*, 4*b* Ends of the first section 4
4*c* Lug
5 Second section
6 Short-circuiting link
7 Fusible element
8 Central electrode
9*a*, 9*b* Cutout
10 Stepped portion

DETAILED DESCRIPTION OF ILLUSTRATIVE EMBODIMENTS

Figure 1B:
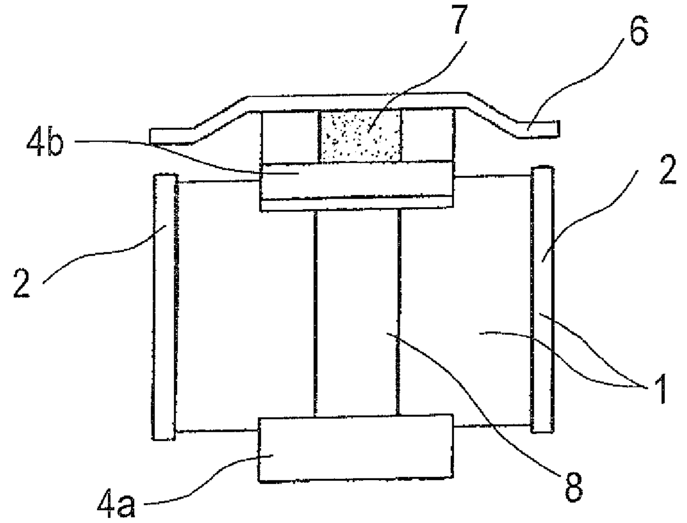
FIG. 1*b* shows an electrical protection component with a short-circuiting clip according to FIG. 1*a* from below.

FIGS. 1*a* and 1*b* illustrate an electrical protection component comprising a surge arrester 1. The surge arrester 1 has a respective electrode 2 at the ends, the electrodes being illustrated in FIG. 1*b*. The surge arrester 1 has a central electrode 8, which projects beyond the hollow body 9 and the electrodes 2 in a radial direction. A short-circuiting clip 3 is attached to the surge arrester 1 by snap action, the clip having a first section 4, the ends 4*a* and 4*b* of which bear on the surge arrester 1. A region of the first section 4 between the two ends 4*a* and 4*b* can be spaced apart from the surge arrester 1 and need not rest flush on the surge arrester 1.

A second section 5 of the clip 3 is spaced apart from the surge arrester 1. The second section 5 has a short-circuiting link 6 at one end. The short-circuiting link 6 of the second section 5 is spaced apart from the first section 4 and thus also from the surge arrester 1 by means of a fusible element 7. In the normal case, the short-circuiting link 6 is prestressed by the spring force of the clip 3 and presses onto the fusible element 7. The short-circuiting link 6 is designed in such a way that it electrically connects the two electrodes 2 to one another in the case where the fusible element 7 melts. In the event of impermissibly high heating of the surge arrester 1, the fusible element 7 melts and thereby clears the path for the short-circuiting link 6 pressing onto the fusible element 7. As a result of the spring force of the short-circuiting clip 3, the short-circuiting link 6 therefore presses onto the external electrodes 2 of the surge arrester 1.

Figure 1C:
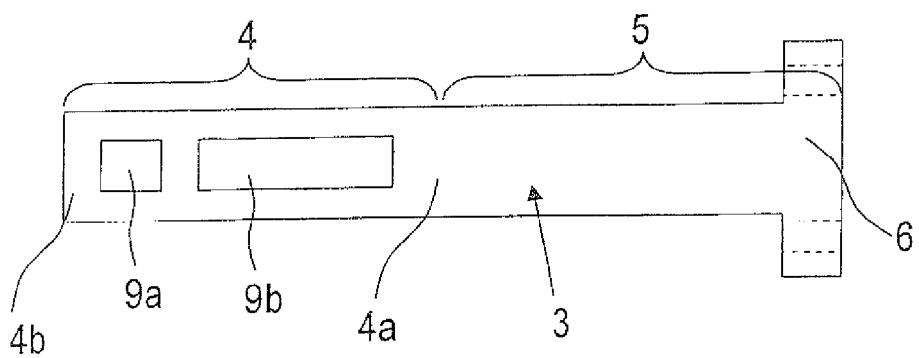
FIG. 1*c* shows the mathematical development of the short-circuiting clip from FIG. 1*a;*

FIG. 1*c* illustrates a mathematical development of the short-circuiting clip 3 from FIGS. 1*a* and 1*b*. The short-circuiting clip 3 has the short-circuiting link 6 at one end of the second section 5. The width over the majority of the length of the short-circuiting clip 3 is preferably smaller than the width of the short-circuiting link 6. To save material and weight, the short-circuiting clip 3 can have one or a plurality of cutouts 9*a*, 9*b*. In the embodiment illustrated, the cutouts 9*a*, 9*b* are situated in a first section 4 of the short-circuiting clip 3. However, it is also possible for the second section 5 to have further cutouts.

Figure 2A:
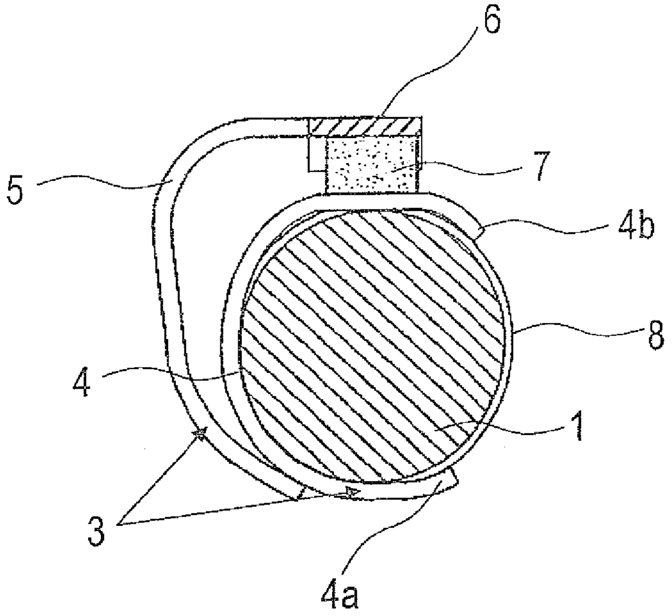
FIG. 2*a* shows a further embodiment of an electrical protection component with a multipartite short-circuiting clip in cross section.

FIG. 2*a* shows a further embodiment of an electrical protection component with a short-circuiting device. A clip 3 is attached to a surge arrester 1 by snap action, the surge arrester 1 having a respective electrode 2 at the ends. In this embodiment, the clip 3 consists of two parts, wherein a first part forms a first section 4 and a second section 5 is formed by a second part. The first section 4 has two ends 4*a* and 4*b*, which bear on the surge arrester 1. The region of the first section 4 between the two ends 4*a* and 4*b* can be spaced apart from the surge arrester 1 or bear on the latter. A short-circuiting link 6 is arranged at one end of the second section 5. The short-circuiting link 6 presses onto a fusible element 7 arranged between the short-circuiting link 6 and the end 4*b* of the first section 4 and thus also between the short-circuiting link 6 and the surge arrester 1. In the event of impermissibly high heating of the surge arrester 1, the fusible element 7 melts and thereby clears the path for the short-circuiting link 6. In the case where the fusible element 7 melts, the short-circuiting link 6 thus presses onto the electrodes 2 and electrically connects them to one another.

Figure 2B:
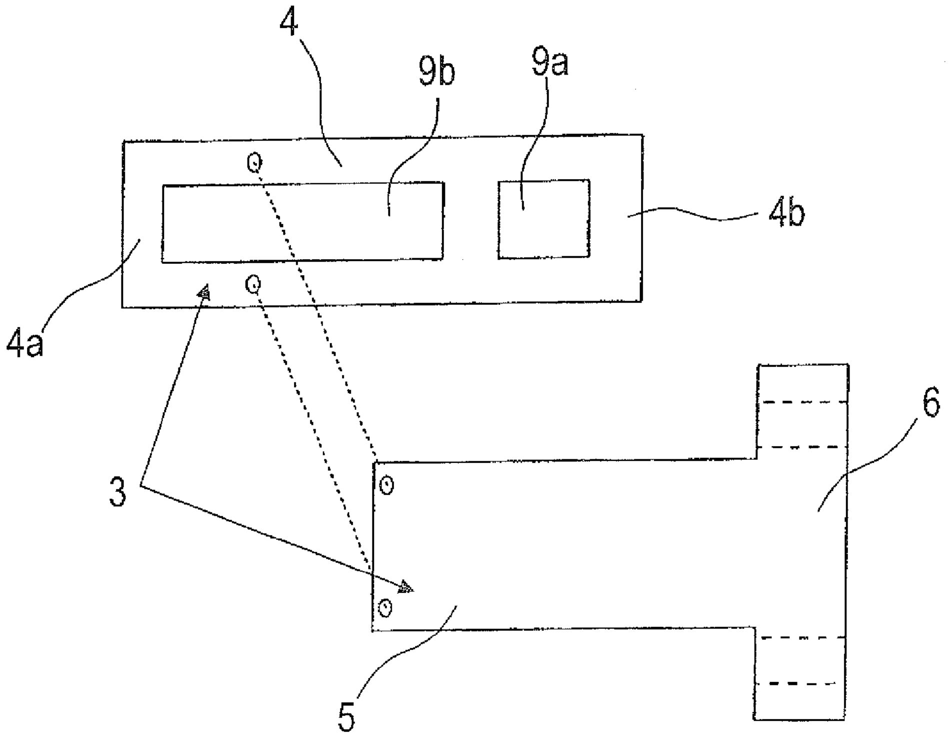
FIG. 2*b* shows the mathematical development of the short-circuiting clip from FIG. 2*a;*

FIG. 2*b* illustrates the two mathematically developed parts of the short-circuiting clip 3 from FIG. 2*a*. The short-circuiting clip 3 has the first section 4. A plurality of cutouts 9*a*, 9*b* are arranged between the two ends 4*a* and 4*b* of the first section 4. The cutouts 9*a*, 9*b* serve for guiding the clip 3 on the central electrode 8. The cutouts 9*a*, 9*b* preferably have a width corresponding to the width of the central electrode 8. Preferably, the fusible element 7 bears at least on the edges of the cutout 9*a*. Through the cutouts 9*a*, the fusible element 7, which has a stepped portion of the size of the cutout 9*a*, has a direct thermal contact with the central electrode 8. The second section 5 of the short-circuit clip 3 has a short-circuiting link 6 at one end. The first section 4 is fixedly connected together with the second section 5 by means of at least two connecting points. Preferably, the second section 5 is connected to the first section 4 by means of welding points, one or a plurality of welding lines or one or a plurality of welding areas. The width of the first section 4 preferably corresponds to the width of the second section 5. The width over the majority of the length of the short-circuiting clip 3 is preferably smaller than the width of the short-circuiting link 6 at the end of the second section 5.

Figure 3A:
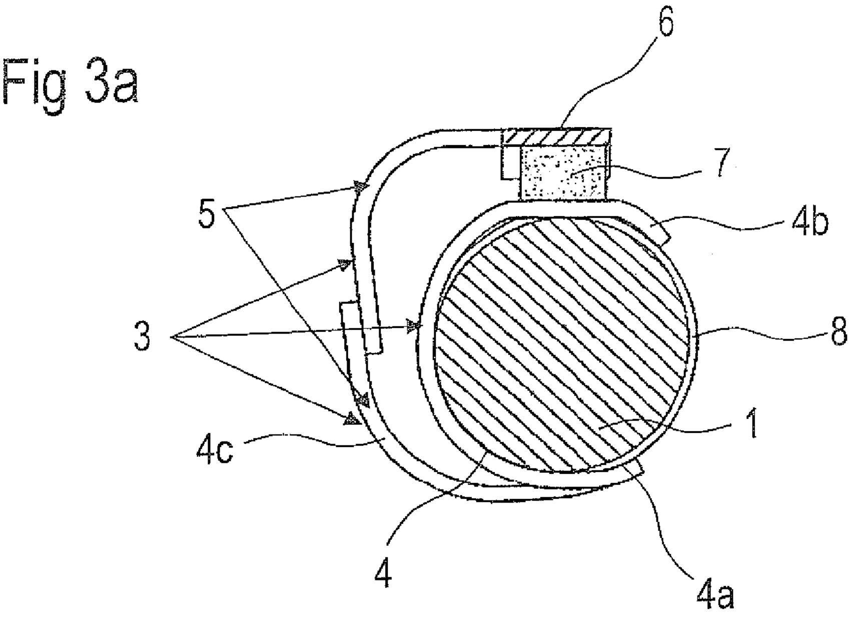
FIG. 3*a* shows a further embodiment of an electrical protection component with a multipartite short-circuiting clip in cross section.

FIG. 3*a* shows a further embodiment of an electrical protection component with a short-circuiting device. A short-circuiting clip 3 is attached to a surge arrester 1 by snap action, the surge arrester having a respective external electrode 2 at the ends. In this embodiment, the short-circuit clip 3 consists of two parts, wherein a first part forms a first section 4. A second section 5 of the short-circuiting clip 3 is formed by a lug 4*c* of the first part and by a second part, wherein the two parts of the second section 5 are connected to one another by means of at least two connecting points. The first section 4 has two ends 4*a* and 4*b*, which bear on the surge arrester 1. A region of the first section 4 between the two ends 4*a* and 4*b* can be spaced apart from the surge arrester 1. A short-circuiting link 6 is arranged at one end of a second section 5. The short-circuiting link 6 presses onto a fusible element 7 arranged between the short-circuiting link 6 and the end 4*b* of the first section 4 and thus also the surge arrester 1. In the case where the fusible element 7 melts, the short-circuiting link 6 thus presses onto the external electrodes 2 and electrically connects them to one another and to the central electrode 8.

Figure 3B:
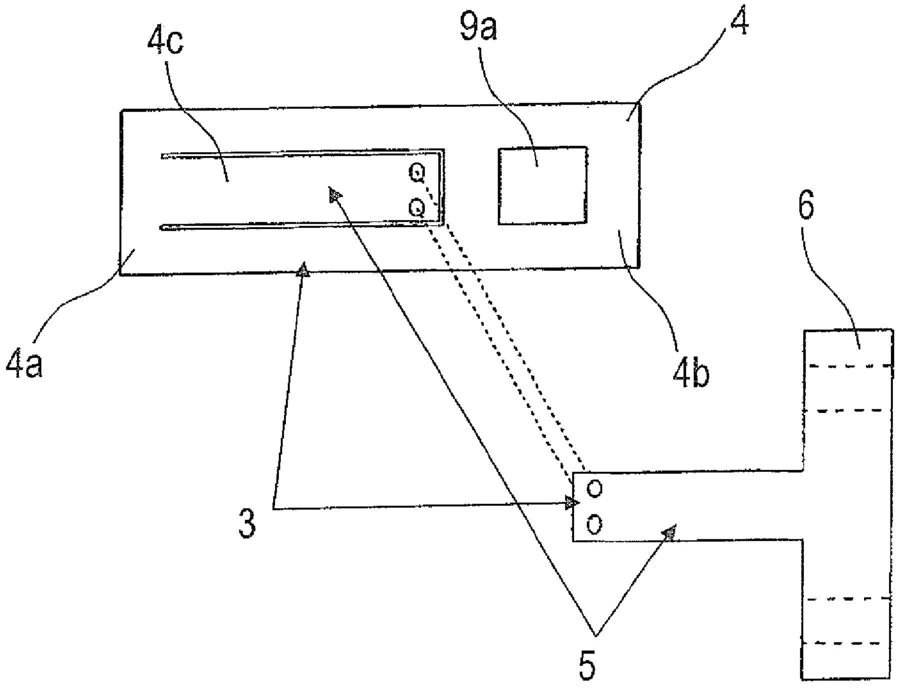
FIG. 3*b* shows the mathematical development of the short-circuiting clip from FIG. 3*a;*

FIG. 3*b* illustrates the two mathematically developed parts of the short-circuiting clip 3 from FIG. 3*a*. The short-circuiting clip 3 has the first section 4. A cutout 9*a* is arranged between the two ends 4*a* and 4*b* of the first section 4. A lug 4*c* of the first section 4 forms, together with a second part, the second section 5, wherein the lug 4*c* is fixedly connected to the second part at least by means of two connecting points. Preferably, the second part is connected to the lug 4*c* of the first section 4 by means of welding. The second section 5 of the short-circuiting clip 3 has a short-circuiting link 6 at one end. The width of the region 4*c* of the first part preferably corresponds to the width of the second section 5. The short-circuiting clip 3 preferably has its largest width in the region of the short-circuiting link 6 at the end of the second section 5.

Figure 4A:
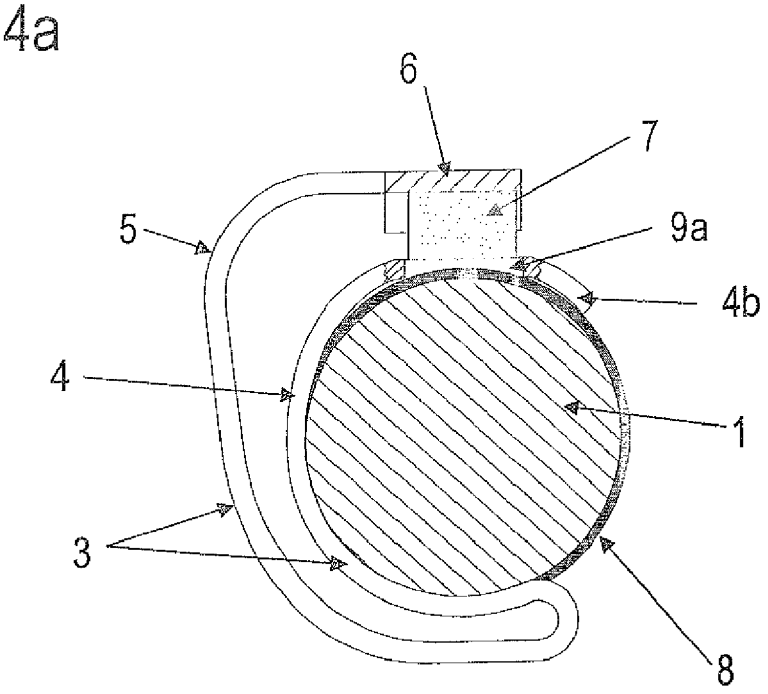
FIG. 4*a* shows an electrical protection component with an integral short-circuiting clip in cross section, wherein the fusible element is spaced apart from the surge arrester.

FIG. 4*a* shows a further embodiment of an electrical protection component in accordance with FIG. 1*a*. An integral short-circuiting clip 3 having a first section 4 and a second section 5 is arranged at a surge arrester 1. The second section 5 of the short-circuiting clip 3 is spaced apart from the first section 4 of the short-circuiting clip 3 by means of a fusible element 7 in the region of the short-circuiting link 6. In the embodiment illustrated, the fusible element 7 has a size that suffices to ensure that the fusible element 7 bears at least on two sides of the edge of the cutout 9*a* of the first section 4 of the short-circuiting clip 3. In FIG. 4*a*, the fusible element 7 does not have direct contact with the central electrode 8 and therefore does not have direct contact with the surge arrester 1 either.

Figure 4B:
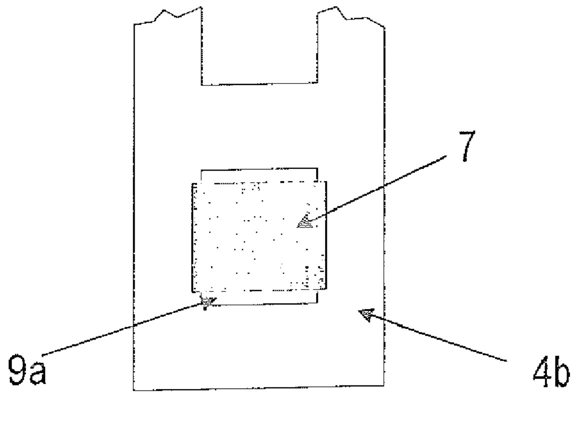
FIG. 4*b* shows a part of the short-circuiting clip with fusible element in accordance with FIG. 4*a;*

FIG. 4*b* illustrates an end 4*b* of the first section 4 of the short-circuiting clip 3 according to FIG. 4*a*, wherein the end 4*b* has a cutout 9*a*. A fusible element 7 is arranged in the region of the cutout 9*a*. The fusible element 7 is preferably arranged in such a way that it bears at least on two sides of the edge of the cutout 9*a*.

Figure 5A:
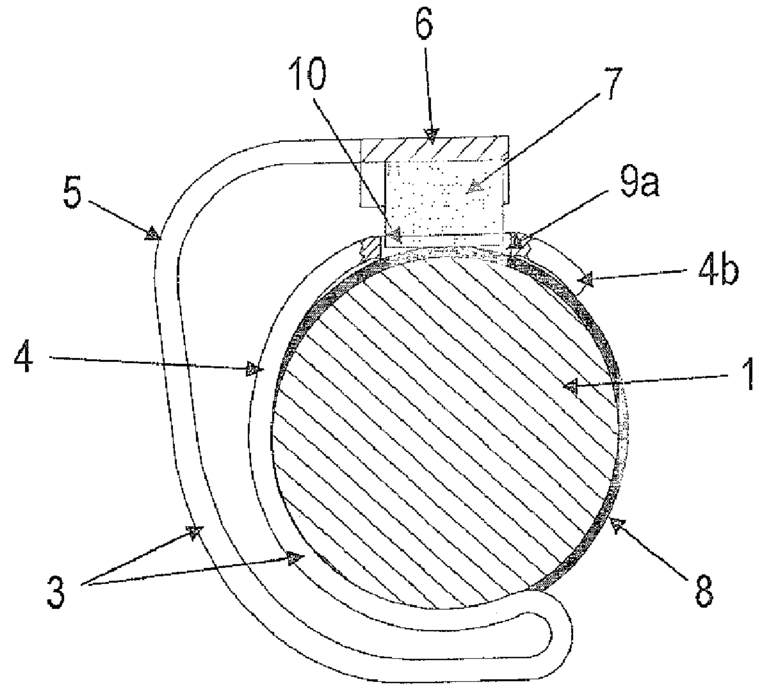
FIG. 5*a* shows an electrical protection component with an integral short-circuiting clip in cross section, wherein the fusible element has a direct contact with the surge arrester.

FIG. 5*a* shows a further embodiment of an electrical protection component as illustrated in FIG. 1*a*. In the embodiment illustrated, the fusible element 7, which is arranged between the first section 4 and the second section 5 of the short-circuiting clip 3, has a stepped portion 10 on at least one side. The stepped portion 10 is preferably only of a size such that the fusible element 7 projects into the cutout 9*a* with the stepped portion 10. The predominant part of the fusible element 7 preferably has a size which at least suffices to ensure that the fusible element 7 bears on at least two sides of the edge of the cutout 9*a*. The fusible element 7 preferably has a direct contact with the central electrode 8 by means of the stepped portion 10. In FIG. 5*a*, therefore, the fusible element 7 has a best possible thermal contact with the central electrode 8 and therefore with the surge arrester 1.

Figure 5B:
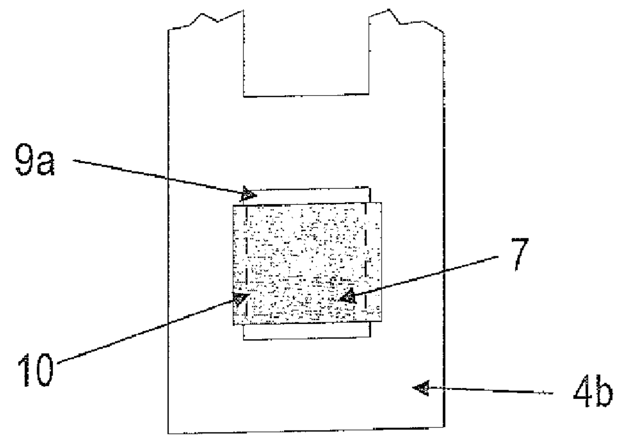
FIG. 5*b* shows a part of the short-circuiting clip with fusible element in accordance with FIG. 5*a;*

FIG. 5*b* illustrates an end 4*b* of the first section of the short-circuiting clip 3 according to FIG. 1*a*. The end 4*b* has a cutout 9*a*, in the region of which a fusible element 7 is arranged. The fusible element 7 projects with at least one stepped portion 10 into the cutout 9*a* preferably to an extent such that the fusible element 7 has a direct contact with the central electrode.

Figure 6A:
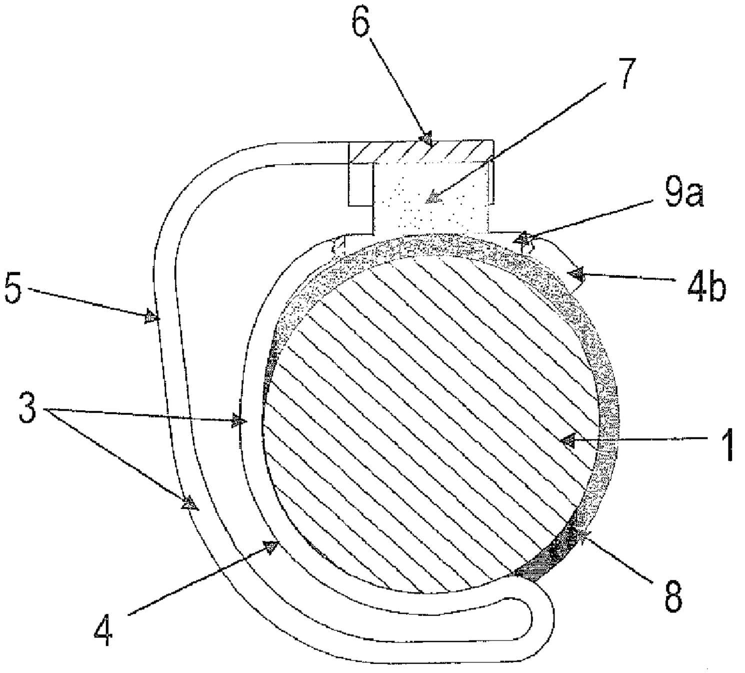
FIG. 6*a* shows a further electrical protection component with an integral short-circuiting clip in cross section, wherein the fusible element has a direct contact with the surge arrester.

FIG. 6*a* shows a further embodiment of an electrical protection component as illustrated in FIGS. 4*a* and 5*a*. In the embodiment illustrated, the cutout 9*a* is preferably of a size such that the central electrode 8 projects into the cutout 9*a* to an extent such that it has a direct contact with the fusible element 7. The fusible element 7 is preferably of a size such that it bears on at least two sides of the edge of the cutout 9*a*, in which case, in comparison with the embodiment illustrated in FIGS. 5*a* and 5*b*, the fusible element preferably does not project into the space produced by the cutout 9*a*. By virtue of the fact that the central electrode 8 projects into the cutout 9*a* to an extent such that it has a direct contact with the fusible element 7, a best possible thermal contact with the fusible element 7 is present.

Figure 6B:
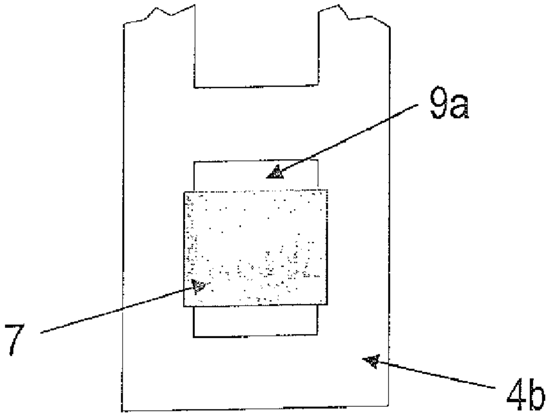
FIG. 6*b* shows a part of the short-circuiting clip with fusible element in accordance with FIG. 6*a*.

FIG. 6*b* illustrates an end 4*b* of the first section of the short-circuiting clip according to FIG. 6*a*, wherein the end 4*b* has a cutout 9*a*. A fusible element 7 is arranged in the region of the cutout 9*a*. The cutout 9*a* is preferably of a size such that a part of the central electrode 8 has a direct contact with the fusible element 7.

Although only a limited number of possible development of the invention could be described in the exemplary embodiments, the invention is not limited thereto. It is possible, in principle, to connect the clip from more than two parts, or to choose a different form of the clip. By way of example, it is possible to connect two first sections attached to the surge arrester by snap action in a parallel fashion to a second section having a short-circuiting link at one end. As a result, stabler fixing of the short-circuiting clip on the surge arrester is possible, for example.

The invention is not limited to the number of elements illustrated.

The description of the subjects specified here is not limited to the individual specific embodiments; rather, the features of the individual embodiments can be combined with one another in any desired manner insofar as is technically expedient.

What is claimed is:

1. An electrical protection component with a short-circuiting device, the component comprising:

a surge arrester which comprises a first electrode and a second electrode; and a thermal short-circuiting device, wherein the thermal short-circuiting device comprises a clip having a first section and a second section, wherein the first section of the clip is attached to the surge arrester by snap action, wherein the second section of the clip is spaced apart from the first section by a fusible element, wherein the second section is prestressed by a spring force of the clip and presses into the fusible element, wherein the second section has a short-circuiting link at an end, and wherein the short-circuiting link is configured to electrically connect the first and second electrodes of the surge arrester to one another when the fusible element melts.

2. The electrical protection component according to claim 1, wherein the first section and the second section of the clip are formed by an one-piece part.

3. The electrical protection component according to claim 1, wherein the clip comprises at least two parts.

4. The electrical protection component according to claim 3, wherein the first section of the clip is formed by a first part and the second section is formed by a second part.

5. The electrical protection component according to claim 1, wherein the first section engages around more than half of the surge arrester.

6. The electrical protection component according to claim 1, wherein ends of the first section have a mechanical contact with the surge arrester.

7. The electrical protection component according to claim 3, wherein the at least two parts of the clip consist of the same material.

8. The electrical protection component according to claim 3 wherein different parts of the clip comprise different materials.

9. The electrical protection component according to claim 1, wherein the clip has a cutout in the first section or in the second section.

10. The electrical protection component according to claim 9, wherein the clip is attached to the surge arrester by snap action near a central electrode of the surge arrester.

11. The electrical protection component according to claim 10, wherein the cutout has a width corresponding to a width of the central electrode.

12. The electrical protection component according to claim 11, wherein the clip is fixed in the region of the central electrode by means of the cutout.

13. The electrical protection component according to claim 10, wherein the clip electrically connects the central electrode to the first and second electrodes when the fusible element melts.

14. The electrical protection component according to claim 1, wherein the fusible element is designed in such a way that it melts in the event of impermissibly high heating of the surge arrester.

15. The electrical protection component according to claim 1, wherein the electrical protection component is surface-mountable.

16. The electrical protection component according to claim 1, wherein the fusible element has a direct thermal contact with a central electrode of the surge arrester.

* * * * *